United States Patent
Nagao et al.

(10) Patent No.: US 6,345,285 B1
(45) Date of Patent: Feb. 5, 2002

(54) LOGARITHMIC VALUE CALCULATION CIRCUIT

(75) Inventors: Fumiaki Nagao, Gifu; Masato Fuma, Ichinomiya, both of (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 09/233,661

(22) Filed: Jan. 19, 1999

(30) Foreign Application Priority Data

Jan. 23, 1998 (JP) .............................. 10-11810

(51) Int. Cl.[7] .............................. G06F 7/556
(52) U.S. Cl. ...................................... 708/517
(58) Field of Search ....................... 708/517, 277, 708/200

(56) References Cited

U.S. PATENT DOCUMENTS 5,363,321 A * 11/1994 Trong et al. ................ 708/517
5,600,581 A * 2/1997 Dworkin et al. ............. 708/517
5,629,884 A * 5/1997 Pan ............................ 708/517
5,642,305 A * 6/1997 Pan ............................ 708/517
5,933,360 A * 8/1999 Larson ........................ 708/517
5,951,629 A * 9/1999 Wertheim et al. ........... 708/517

* cited by examiner

*Primary Examiner*—David H. Malzahn
(74) *Attorney, Agent, or Firm*—Cantor Colburn LLP

(57) ABSTRACT

Logarithm of data x being input is taken to calculate a decibel value y. The input value x is separated into mantissa value a and exponent value b by a separator or on the basis of an expression $x = a \cdot 2^b$. Logarithmic value $10 \cdot \log_{10} a$ corresponding to the mantissa value a is read from ROM. The exponent value b is multiplied with a constant $10 \cdot \log_{10} 2$ for logarithm of 2 by a multiplier. A logarithmic value of the value a read from the ROM is added to $b \cdot 10 \cdot \log_{10} 2$ output from the multiplier by an adder to obtain the decibel value y. Thus, a simple circuit can compute the decibel value at a high speed.

4 Claims, 1 Drawing Sheet

LOGARITHMIC VALUE CALCULATION CIRCUIT

BACKGROUND OF THE INVENTION

1. Technical Field of the Invention

The present invention relates to a decibel value calculation circuit for computing a logarithmic value y of input data x, and more particularly to a decibel value calculation circuit for computing it by separating into mantissa value a and exponent value b on the basis of expression of data $x = a \cdot 2^b$.

2. Description of the Related Art

Conventionally, audio data and image data to be stored or transmitted are encoded and compressed, and a logarithm of such data is often taken to calculate a decibel value. For example, encoding compression processing of such data generally includes processing to quantize data by allotting a predetermined number of bits to it. When the number of quantized bits is allotted, a signal level is often referred to, and it is necessary to calculate the decibel value of data.

If an input data value is x and a decibel value is y, the decibel value is calculated by logarithmic calculation as follows:

$$y = \alpha \cdot \log_{10} x$$

where, $\alpha$ is a constant such as 10 or 20.

Conventionally, software installed in a microcomputer is used to make such calculation.

However, such computational software has a disadvantage in that computation requires significant time. It is especially desirable for a device such as an MD (mini disc) player to have a data-processing circuit integrated into a single integrated circuit. It is desirable that the entire circuit be formed of a simple circuit and be able to calculate at a satisfactorily high speed. Therefore, it is desired that the circuit for calculation be made of hardware and have a simple configuration.

SUMMARY OF THE INVENTION

It is an object of the invention to provide a decoder which can make the above-described computation by a relatively simple small-scale circuit.

The invention processes input data x by separating it into mantissa value a and exponent value b by a separator. Thus, ROM is only used to store a table of $\log_{10} a$, and its size can therefore be very small. Exponent value b is multiplied with a constant $n \cdot \log_{10} 2$ (n=integer) by a multiplier. Addition of output from the ROM and that from the multiplier by an adder can result in a calculated result y. Accordingly, a small table and single multiplication and addition are all required to be made, so that the circuit can be made simple, and high-speed arithmetic can be performed.

According to a preferred embodiment of the invention, the separator converts the data x expressed with a fixed point into data expressed with a floating point.

DESCRIPTION OF THE PREFERRED EMBODIMENT

Figure 1:
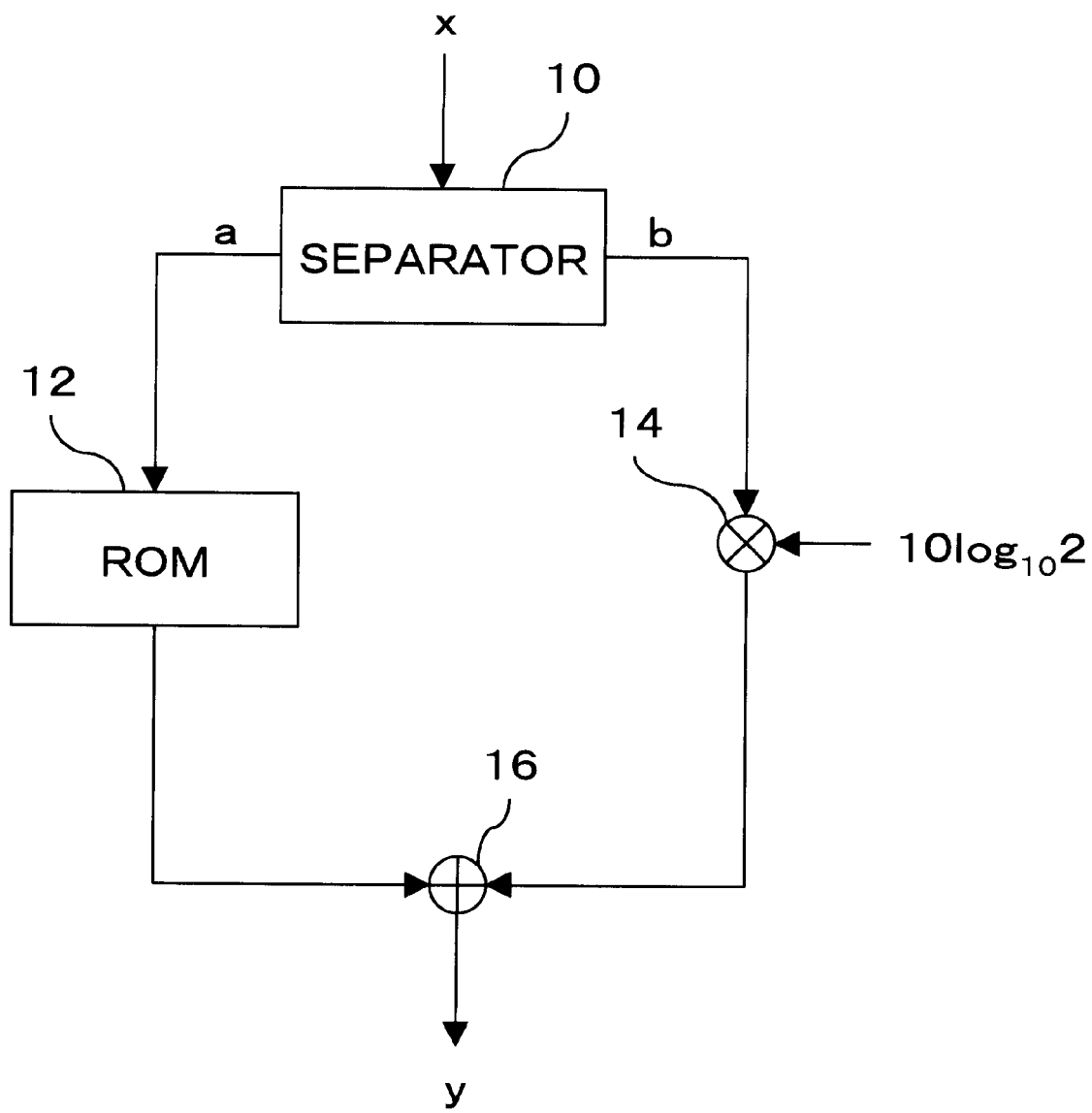
FIG. 1 is a block diagram showing a configuration of the circuit according to a preferred embodiment of the present invention.

A preferred embodiment of the present invention will be described with reference to the attached drawing.

FIG. 1 is a block diagram showing the general configuration of the device according to the present embodiment. Input data x is entered to a separator 10 and separated into a mantissa value a and an exponent value b according to $x = a \cdot 2^b$. When the input data x is floating-point data, the separator 10 simply separates it into the mantissa value a and the exponent value b. When the data x is fixed-point data, the separator 10 converts it from fixed point to floating point data and then separates it into a mantissa value a and an exponent value b. For a general floating point indication, the exponent value b is selected such that the value a satisfies $1 > a \geq 0.5$. The value a can also fall in another range depending on the manner of selecting the value b, but its maximum value must be less than two times its minimum value.

The mantissa value a is then supplied as an address to ROM 12. The ROM 12 has value $10 \cdot \log_{10} a$ in a table therein. The table size is variable and depends on the number of bits (precision) of the mantissa value a or the like, as is determined in advance. Accordingly, data required by the system is stored in the ROM 12. Thus, the value $10 \cdot \log_{10} a$ is output from the ROM 12 in response to the input mantissa value a.

Meanwhile, the exponent value b obtained by the separator 10 is supplied to a multiplier 14. The multiplier 14 is also supplied with the value $10 \cdot \log_{10} 2$, and both values are multiplied thereby. Then, $b \cdot 10 \cdot \log_{10} 2$ is output from the multiplier 14. The value $10 \cdot \log_{10} 2$ is a constant of about 3.0 and supplied in precision according to the system.

And, $10 \cdot \log_{10} a$ output from the ROM 12 and $b \cdot 10 \cdot \log_{10} 2$ output from the multiplier 14 are entered an adder 16 and added by it. Therefore, the adder 16 outputs as follows.

$$10 \cdot \log_{10} a + b \cdot 10 \cdot \log_{10} 2 = 10 \log_{10} a \cdot 2^b = 10 \log_{10} x = y$$

As described above, the apparatus in this embodiment processes the input data x by separating it into the mantissa value a and the exponent value b. Therefore, the ROM 12 is simply required to store the table of $10 \log_{10} a$ and can be made very small. The exponent value b is multiplied with the constant $10 \cdot \log_{10} 2$ by the multiplier 14, and the output from the ROM 12 is added to the output from the multiplier 14 by the adder 16 to obtain the calculated result y. Therefore, a small table and single multiplication and addition are all required to be made, so that the circuit can be made simple, and high-speed arithmetic can be performed.

For example, if the input data x is floating-point data, the mantissa value a is expressed as $1 \leq a < 2$, and the input data x is 01000110. Here, the data x has the mantissa value a=010001 and the exponent value b=10. The mantissa value a has a decimal point between the fourth digit and the fifth digit to show 01.0001, then a=1.0625 in decimal. Meanwhile, the exponent value b is 2 in decimal. Therefore, the input data x is expressed as $x = 01000110 = 1.0625 \times 2^2 = 4.25$ in decimal.

When the input data x=01000110 is input, it is separated into a=010001 and b=10 by the separator 10. The value a is entered the ROM 12 and a corresponding value 00.01=0.25 is output.

The value b=10 is supplied to the multiplier 14 and multiplied with $\log_{10} 2 = 11.00$, then 110.00 is output. The adder 16 performs addition to output y=110.01. The value 110.01 is equal to 6.25, which is very close to $10 \cdot \log_{10} 4.25 \neq 6.28$ determined from the table or the like.

As described above, the present invention processes the input data x by separating it into the mantissa value a and the exponent value b. By storing the table of $10 \cdot \log_{10} a$, the output from the table can be added to the multiplied value of the constant $10 \cdot \log_{10} 2$ and the exponent value b to obtain a calculated result. Thus, a small table and single multiplication and addition are all required to be made, so that the circuit can be made simple, and high-speed arithmetic can be performed.

While there has been described that what is at present considered to be a preferred embodiment of the invention, it is to be understood that various modifications may be made thereto, and it is intended that the appended claims cover all such modifications as fall within the true spirit and scope of the invention.

What is claimed is:

1. A logarithmic value calculation circuit for calculating a logarithmic value y of data x being input, comprising:

a separator for separating the data x into mantissa value a and exponent value b on the basis of an expression $x = a \cdot 2^b$;

a table for storing a plurality of logarithmic values previously determined in correspondence with the mantissa value a;

a multiplier for multiplying the exponent value b with a constant value which is an integral multiple of a logarithmic value of 2; and an adder for adding a logarithmic value, which is selectively read from the table according to the mantissa value a, and a multiplied value output from the multiplier.

2. The circuit according to claim 1, wherein the separator converts the data x expressed with a fixed point to floating point data, and then separates it into the mantissa value and the exponent value.

3. The circuit according to claim 1, wherein the data x being input is floating-point data, and the mantissa value a is expressed as $1 \leq a \leq 2$.

4. The circuit according to claim 1, wherein the data x being input is audio data, and the logarithmic value y is a decibel value of the audio data.

* * * * *

UNITED STATES PATENT AND TRADEMARK OFFICE
CERTIFICATE OF CORRECTION

PATENT NO. : 6,345,285 B1
DATED : February 5, 2002
INVENTOR(S) : Fumiaki Nagao et al.

It is certified that error appears in the above-identified patent and that said Letters Patent is hereby corrected as shown below:

Column 2,
Line 62, delete "$\neq$" and insert therefor -- $\approx$ --

Signed and Sealed this

Twenty-second Day of March, 2005

JON W. DUDAS
*Director of the United States Patent and Trademark Office*